C. E. STARR.
VEHICLE DRIVING GEAR.
APPLICATION FILED OCT. 2, 1917.
1,370,378.
Patented Mar. 1, 1921.
2 SHEETS—SHEET 1.
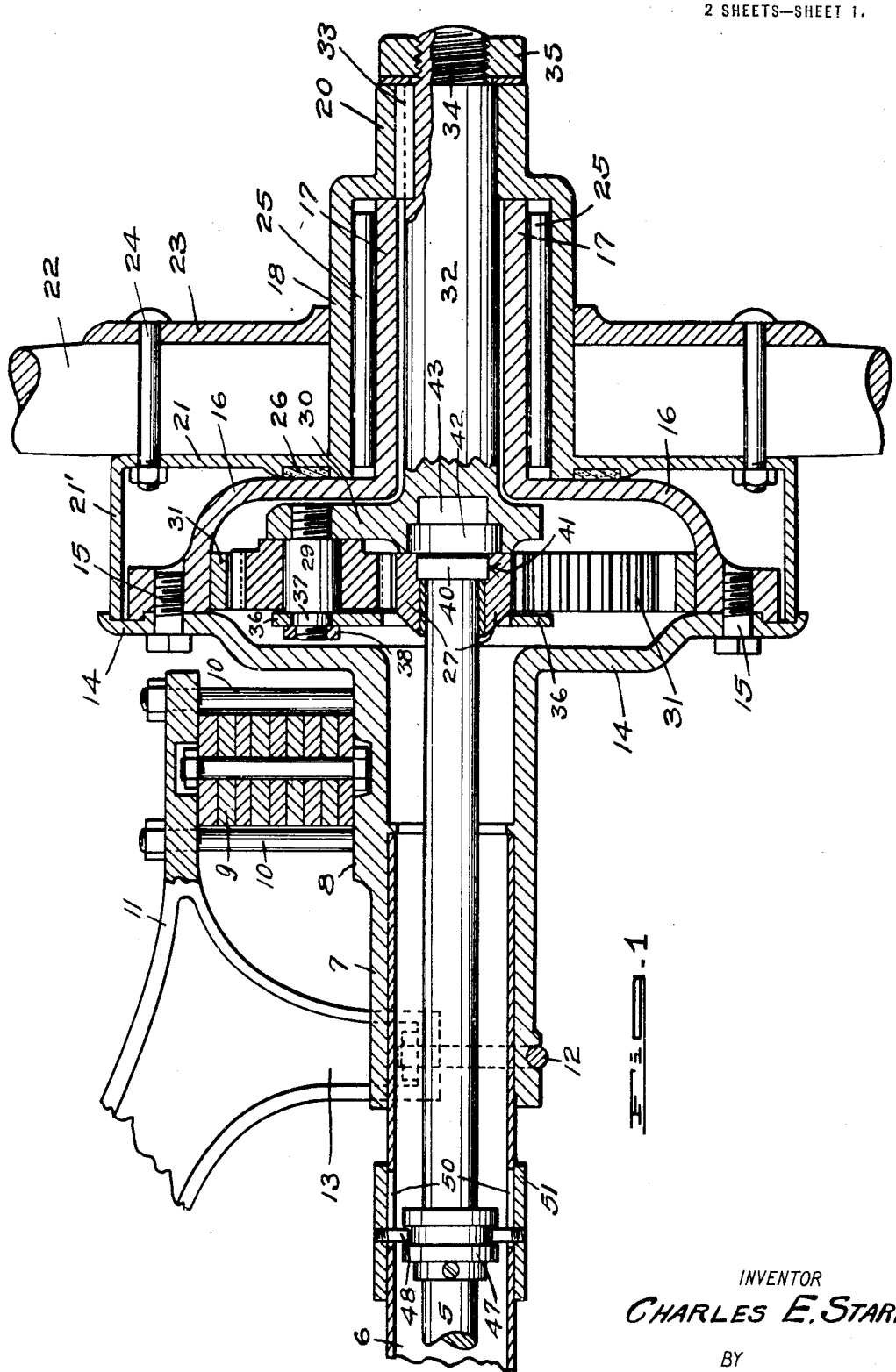
INVENTOR
CHARLES E. STARR
BY
Horace Barnes
ATTORNEY

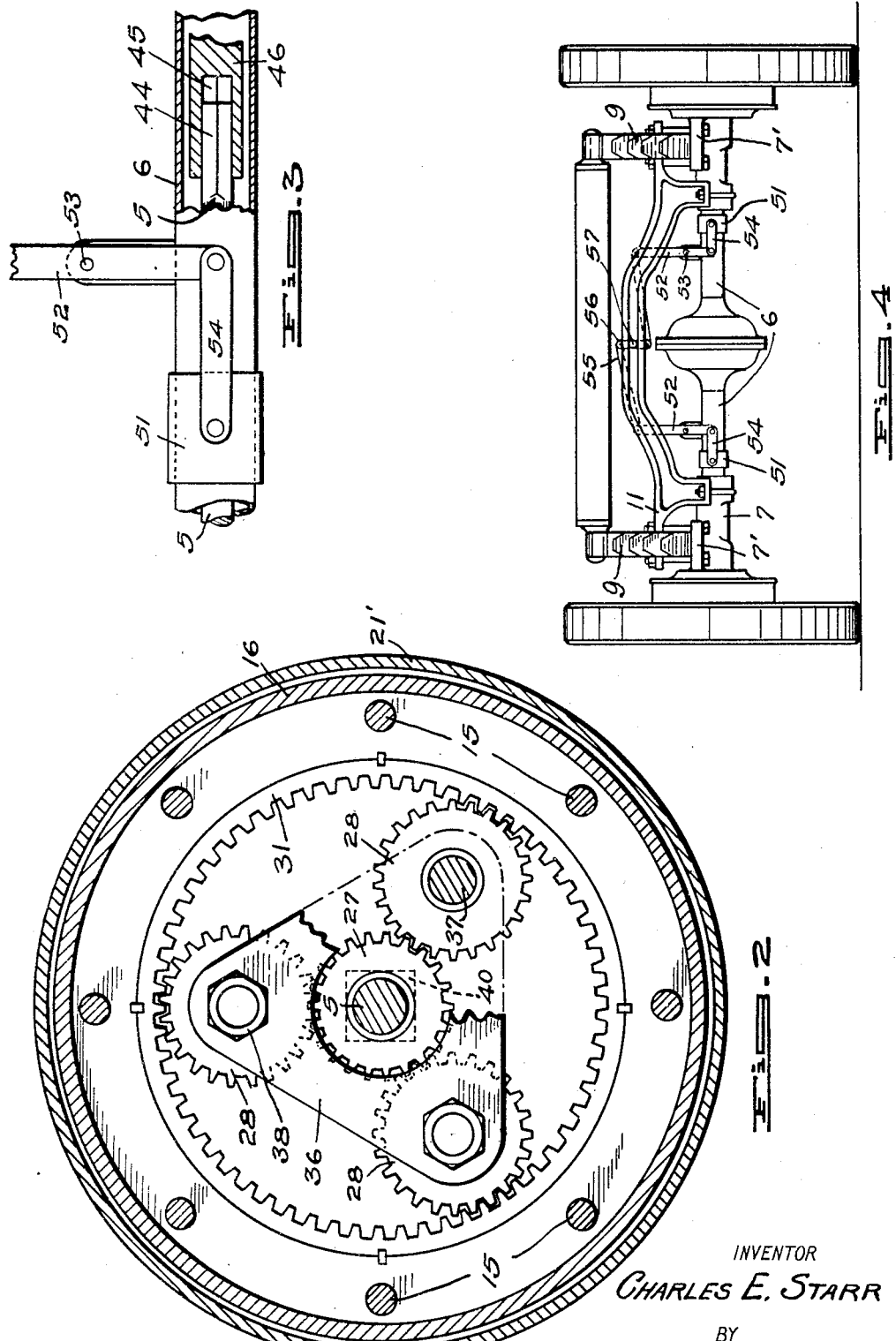

UNITED STATES PATENT OFFICE.

CHARLES E. STARR, OF SEDRO WOOLLEY, WASHINGTON, ASSIGNOR TO SEATTLE PATENT HOLDING CORPORATION, OF SEATTLE, WASHINGTON, A CORPORATION OF WASHINGTON.

VEHICLE DRIVING-GEAR.

1,370,378.        Specification of Letters Patent.        Patented Mar. 1, 1921.

Application filed October 2, 1917. Serial No. 194,324.

*To all whom it may concern:*

Be it known that I, CHARLES E. STARR, a citizen of the United States, and resident of Sedro Woolley, county of Skagit, and State of Washington, (whose post-office address is Sedro Woolley, Washington,) have invented a new and useful Improvement in Vehicle Driving-Gears, of which the following is a specification.

This invention relates to improvements in driving mechanism for the rear wheels of motor vehicles and the object of this improvement is to provide a strong and durable speed reduction gearing for the driving wheels of a motor vehicle that is disposed within the hub of the wheels and that is capable of delivering a maximum of power to turn the wheel in proportion to the torque of the axle.

A further object of the invention is to provide variable speed mechanism in the gearing that is located within the hub of the wheel, and at the same time to so design the various parts as to admit of a full floating axle.

A still further object is to provide a rigid truss between the two rear wheels of the vehicle so that the axle housing will be relieved of undue strain and to position the body supporting springs as near above the center of the wheel as possible.

The power transmission herein disclosed is designed especially for use in converting ordinary automobiles or pleasure cars into trucks or tractors, although it is obvious that the same may be used to great advantage in the construction of new vehicles of this type.

By the use of this form of transmission the drive chains and jack shaft commonly used on rebuilt trucks are eliminated and a completely housed gearing that is located in the hub of the wheel and connected directly with the differential axle is substituted therefor. It is also possible owing to the change speed mechanism embodied in this device to secure the same high driving speed in a truck that is usually secured in a touring car.

It will also be apparent from the following description that if desired, all change speed gears between the power unit and the differential may be dispensed with since means for effecting change in the gear ratio are embodied directly in the wheels at the point where the power is ultimately delivered. In this way the differential gears are relieved of a great amount of the strain to which they are subjected when the reduction speed gearing is located between the differential and the source of power.

The invention consists in the novel construction of speed reduction gearing for the drive wheels of motor vehicles and in the adaptation and combination of such gearing with the differential shaft and drive wheels, as will be more clearly hereinafter described and claimed.

In the accompanying drawings Figure 1 is a view in vertical mid-section of a device constructed in accordance with this invention. Fig. 2 is a view in cross section substantially on broken line 2—2 of Fig. 1, showing parts of the gear mechanism in elevation. Fig. 3 is a view partly in elevation and partly in cross section illustrating a detail of the invention and Fig. 4 is a somewhat diagrammatic view in rear elevation of a vehicle upon which the invention is installed.

The driving mechanism hereinafter described is in duplicate on both sides of the differential gear of a motor vehicle and the description of the various parts on one side will be considered as applying to both sides.

Referring to the drawings throughout which like reference numerals indicate like parts, the numeral 5 indicates a differential axle that is disposed within an axle housing 6, and connected with suitable differential mechanism, not shown, whereby it may be driven.

7 is a sleeve that is adapted to fit over the end of the housing 6 and is rigidly connected therewith. The sleeve 7 is provided with a suitable saddle 8 upon which a spring 9 is secured by bolts 10, that extend upwardly through side flanges 7' on the sleeve 7 and through a truss bolster 11, the end of which lies upon the top of the spring. The inner end of the sleeve 7 is connected by a U-bolt 12 with a depending portion 13 of the truss bolster in such a manner that the major portion of the weight of the vehicle body is transmitted by the truss bolster 11 directly to the sleeve 7 and the axle housing is relieved of excessive strain. As will be seen in Fig. 4 the bolster 11 forms a rigid arched supporting truss between the two wheels on opposite ends of the axle housing.

The sleeve 7 is provided with an annular flange 14 and is rigidly secured by peripherally arranged bolts 15 to the annular abutting flange portion 16 of a bearing sleeve 17 that extends within the hub of the wheel. The flange portions 14 and 16 are each concave or substantially dish shaped so that when they are bolted together they form a gear box or receptacle therebetween for the reception of suitable speed reduction driving gears.

The wheel comprises an annular hub member 18 having an outer end 20 of reduced diameter and an inner portion that is flanged as at 21 and terminates in an annular brake drum 21'. Spokes 22 may be inserted between the flange 21 and an annular plate 23 that fits over the hub member 18 and may be rigidly secured therebetween by bolts 24 to form a solid wheel.

The interior diameter of the hub member 18 is substantially larger than the exterior diameter of the sleeve 17, thereby providing an annular recess within which bearing rollers 25 for the wheel to rotate on may be disposed.

26 is a washer, preferably of felt or like material, that is interposed between the flange 21 and the flange 16 to form a packing and prevent the escape of lubricating material from the roller bearings 25.

The gear transmission proper comprises a pinion 27 disposed on the outer end of the differential axle 5 and adapted to mesh with idler pinions 28 that are carried on journal studs 29 on a spider 30. The idler pinions 28, preferably three in number, are disposed to mesh with an annular internal gear 31 that is fixedly secured to the flange 16.

The spider 30 is formed with an integral shank 32 that extends outwardly through the bearing sleeve 17 and is rigidly secured by a key 33 to the reduced portion 20 of the hub member so that when the spider is rotated the wheel will be rotated therewith.

The end of the shank 32 is preferably reduced in diameter and threaded as at 34 for the reception of a nut 35 that fits against the end of the hub portion 20 to hold the wheel on the bearing and the key 33 in place and to give a finished appearance to the end of the hub.

The outer ends of the bearing studs 29 are rigidly connected in spaced relation by a triangularly shaped plate 36 that is provided with suitable holes that fit over reduced portions 37 on the ends of the studs and is secured on such studs by nuts 38.

The outer end of the differential axle 5 is provided with a squared head 40 that is adapted to fit within a squared receptacle 41 in the pinion 27 to drive the train of gears.

The inner face of the spider 30 is provided with an annular recess 42 that is sufficiently large to permit the squared end portion 40 of the axle 5 to freely turn therein when the axle is moved end-wise so that the portion 40 is within the recess 42. The spider 30 is also provided at the bottom of the recess 42 with a squared recess 43 so that when the axle is moved end-wise past the recess 42 the squared end 40 will engage within the recess 43 and drive the shank 32 and the wheel of the vehicle directly.

The axle 5 is preferably provided with a squared inner end 44 that telescopes within a squared receptacle 45 in the end of a shaft section 46 that connects with the differential in such a manner that the axle 5 may be moved length-wise within the housing, but will be driven by the differential.

For the purpose of shifting the axle 5 the same may be provided with a fixed collar 47 that is engaged by pins 48 that project through slots 50 in the axle housing and are connected with a sleeve 51 that is adapted to be moved lengthwise of the housing, by lever arm 52 that is pivoted as at 53 and connected by a short link 54 with the sleeve 51 and by a longer link 55 with a cross arm 56 on the end of a shaft 57 that may be turned in any suitable manner by mechanism, not shown, which is preferably located within reach of the driver, to shift the position of the axle.

The mechanism described above is necessarily in duplicate so that the two portions of the axle on opposite sides of the differential will be shifted simultaneously to effect the same change in driving relation in both rear vehicle wheels at the same time.

When the squared end 40 of the axle 5 is positioned within the recess 41 in the pinion 27 and the axle is driven the pinion 27 will serve to rotate the idler gears 28 in an obvious manner at a reduced speed within the internal gear 31, thereby carrying or rotating the spider and driving the wheel that is rigidly secured to the spider shank 32.

When the axle 5 is moved outwardly to position the squared end 40 within the large recess 42 the axle may be rotated without driving the gearing, thus constituting a neutral position.

When the squared end 40 of the shaft 5 is moved into the recess 43 in the spider 30 the drive wheel will be directly connected with the differential axle and will rotate at the same speed therewith.

It is obvious that when the ring gear 31 is held stationary and the spider 30 is rotated through the agency of the idler gears 28 and pinion 27 a greater turning force will be applied to the pivots of the idler gears than would be applied to the internal gear by the same axle torque if the spider were held stationary and the internal gear driven, but it is also obvious that this greater turning force is applied on a shorter radius or lever arm and that the speed of rotation of the driven parts in proportion to the speed of rotation of the axle is less.

When the device is in use the gear box may be filled with lubricant so that the various working parts will always be thoroughly lubricated.

In operation, when the vehicle is working under a heavy load the axle 5 will be in the position shown in Fig. 1 with the squared end 40 in engagement with the recess 41 in the pinion 27, thus giving a drive of reduced speed and greatly increased power. When the vehicle is running light the axle may be shifted from the low gear through the neutral and into the high gear position by moving it outwardly until the square end 40 is within the square recess 43. This establishes a direct connection between the axle and the wheel and gives a high speed drive, thus making it possible to secure the same high speed in a freight vehicle as may be had in a touring car without driving the engine at excessive speed.

When the axle 5 is directly connected with the spider 30 the pinion 27 is free to turn idly on the axle in response to the travel of the idler gears which are carried with the spider 30.

This device may be installed on an ordinary automobile as an emergency feature and the speed reduction gears in the hubs may be used when more power is needed than can be obtained by the use of the low speed gear of the automobile.

It is obvious that changes in the design and construction of the various parts of this device may be resorted to within the scope of the following claims.

What I claim and desire to protect by Letters Patent is—

1. In combination with a differential axle, a non-rotative housing therefor and a wheel journaled to rotate on the housing, an internal gear fixedly mounted within the housing, a spider having operative driving connection with said wheel, idler gears journaled on said spider and meshing with the internal gear, a pinion supported on the axle and meshing with said idler gears and means for effecting a direct driving connection between the axle and spider or the axle and gear thereon.

2. In combination with a differential axle, a non-rotative housing therefor and a wheel journaled to rotate on the housing, an internal gear fixedly mounted within the housing, a spider having operative driving connection with said wheel, idler gears journaled on said spider and meshing with the internal gear, a pinion supported on the axle and meshing with said idler gears, a locking member fixed on the axle and means for shifting the axle longitudinally to move the said locking member from neutral position into locking engagement with the pinion or spider.

3. The combination with a differential axle having a driving head thereon, a non-rotative housing for the axle, and a wheel journaled to rotate on the housing of an internal gear mounted within the housing, a spider having an extension operatively connected to drive the wheel and having a socket therein for receiving said driving head to effect driving connection with the axle, idler gears mounted on the spider in mesh with the internal gear, a pinion supported on said axle having a socket therein for receiving the driving head to effect a driving connection therewith and means for shifting the axle longitudinally to move said driving head from neutral position into and from the pinion and spider sockets for the purpose set forth.

4. The combination with a differential axle and housing therefor, of a two part gear box one end of said gear box terminating in an axial bearing and the other end of said gear box terminating in a sleeve adapted to fit over and be secured to said axle housing, a wheel journaled on the said bearing, a pinion on the end of said axle, an internal gear fixedly secured within said gear box, a spider secured to said wheel and idler gears rotatably mounted on said spider and meshing with said pinion and said internal gear to drive said spider and wheel in response to rotation of said axle.

5. The combination with a differential axle and housing therefor, of a two part gear box one end of said gear box terminating in an axial bearing and the other end of said gear box terminating in a sleeve adapted to fit over and be secured to said axle housing, a pinion on the end of said axle, an internal gear fixedly secured within said gear box, a wheel provided with a hub that is journaled on the said bearing, a spider having a shank that extends outwardly through said bearing and is secured to the hub of the wheel, and idler gear rotatably mounted on said spider and meshing with said pinion and said internal gear to drive said spider and wheel in response to rotation of said axle.

6. The combination with a differential axle and housing therefor, of a two part gear box one end of said gear box terminating in an axial bearing and the other end of said gear box terminating in a sleeve adapted to fit over and be secured to said housing, a pinion on the end of said axle, an internal gear fixedly secured within said gear box, a wheel provided with a hub that is journaled on said bearing, a spider having a shank that extends outwardly through said bearing and is secured to the hub of the wheel, a plurality of bearing studs mounted on said spider, a plate rigidly connecting the outer ends of said bearing studs, and idler gears rotatably mounted on said bearing studs and meshing with said pinion and said internal gear to drive said bearing studs and wheel in response to rotation of said axle.

7. The combination with a differential axle and housing therefor of a sleeve adapted to fit over said housing and be secured thereto, said sleeve having an annular flanged outer portion, a bearing sleeve having an annular flanged inner portion adapted to be rigidly secured to the flanged outer portion of said first named sleeve said two flanged portions forming a gear housing, a wheel rotatably mounted on said second sleeve, an internal gear fixedly secured within said gear housing, a pinion on the end of said axle, a spider having a shank that extends outwardly through the bearing sleeve and is rigidly secured to said wheel, and idler gears carried by said spider and meshing with said internal gear and said pinion whereby said spider will be driven to rotate said wheel.

8. The combination with a differential axle and a housing therefor, of a two part gear box, an integral bearing member on one end of said gear box in axial alinement therewith, an integral sleeve on the other end of said gear box and adapted to fit over and be secured to said axle housing, a pinion on the end of said axle said pinion having a square recess, a square head on said axle for engaging within said recess to lock said pinion to said axle, means for moving said axle lengthwise within said housing, an internal gear secured within said gear box, a wheel having a hub journaled on said bearing member, a spider within said gear box said spider having an annular recess that will permit the square head on the axle to turn freely when the same is positioned therein and a square recess into which the square axle head may be moved to lock the spider to the axle, a shank disposed within said bearing and connecting said spider with said wheel hub and idler gears rotatably mounted on said spider and meshing with said pinion and said internal gear whereby said spider will be driven by the rotation of said pinion.

9. The combination with a differential axle and an axle housing therefor, of a sleeve adapted to fit over said housing and be secured thereto said sleeve having an annular flanged outer end portion, a tubular bearing disposed in alinement with said sleeve said tubular bearing having an annular flanged inner end that is adapted to be rigidly secured to the flanged outer portion of said sleeve said two flanged portions being dished and forming a gear housing, a wheel mounted on said tubular bearing, a brake drum on said wheel the said brake drum encircling the said gear housing and speed reduction gearing disposed within said gear housing to establish a driving connection between said differential axle and said wheel.

10. The combination with a differential axle and an axle housing therefor, of a sleeve adapted to fit over said housing and be secured thereto said sleeve having an annular flanged outer end portion, a tubular bearing disposed in alinement with said sleeve said tubular bearing having an annular flanged inner end that is adapted to be rigidly secured to the flanged outer portion of said sleeve said two flanged portions being dished and forming a gear housing, a wheel mounted on said tubular bearing, a brake drum on said wheel the said brake drum encircling the said gear housing, speed reduction gearing disposed within said gear housing and means for moving said differential axle lengthwise within its housing to selectively establish a driving connection with said speed reduction gearing, a direct connection with said wheel, or to disconnect said axle from both said gearing and said wheel.

11. The combination with an axle housing, of an extensible floating differential axle disposed therein, wheels rotatably connected with the ends of said axle housing, speed reduction gearing disposed within the hub portions of said wheels, and means for moving the two ends of said differential axle lengthwise within said housing to selectively establish a direct driving connection with said wheels or a driving connection of reduced speed ratio through the medium of said gearing with said wheels.

Signed at Wenatchee, Washington, this 26th day of Sept., 1917.

CHARLES E. STARR.